United States Patent
Hügelschäfer et al.

(10) Patent No.: US 8,089,372 B2
(45) Date of Patent: Jan. 3, 2012

(54) METHOD FOR TRANSMISSION OF DATA FOR CONTROLLING AN HVDC TRANSMISSION INSTALLATION

(75) Inventors: Ludwig Hügelschäfer, Bamberg (DE); Jürgen Sperber, Fürth (DE); Werner Stecher, Abenberg (DE)

(73) Assignee: Siemens Aktiengesellschaft, Munich (DE)

( * ) Notice: Subject to any disclaimer, the term of this patent is extended or adjusted under 35 U.S.C. 154(b) by 979 days.

(21) Appl. No.: 11/916,388

(22) PCT Filed: Jun. 17, 2005

(86) PCT No.: PCT/DE2005/001102
§ 371 (c)(1),
(2), (4) Date: Feb. 29, 2008

(87) PCT Pub. No.: WO2006/128400
PCT Pub. Date: Dec. 7, 2006

(65) Prior Publication Data
US 2008/0198037 A1   Aug. 21, 2008

(30) Foreign Application Priority Data
Jun. 2, 2005   (DE) ................. PCT/DE2005/001206

(51) Int. Cl.
*G08C 19/16*   (2006.01)
(52) U.S. Cl. .................................. 340/870.01
(58) Field of Classification Search .............. 340/870.01
See application file for complete search history.

(56) References Cited

U.S. PATENT DOCUMENTS

| | | | | |
|---|---|---|---|---|
| 4,374,359 A * | 2/1983 | Missout | ........................... | 324/96 |
| 4,648,018 A * | 3/1987 | Neupauer | ........................ | 363/35 |
| 4,719,580 A * | 1/1988 | Nimmersjo | ..................... | 702/59 |
| 5,123,015 A | 6/1992 | Brady, Jr. et al. | | |
| 5,170,338 A | 12/1992 | Moritoki et al. | | |
| 5,406,495 A | 4/1995 | Hill | | |
| 2004/0172207 A1 | 9/2004 | Hancock et al. | | |
| 2006/0291856 A1 * | 12/2006 | Hampel | ........................... | 398/9 |

FOREIGN PATENT DOCUMENTS

| DE | EP000795944 | * | 9/1997 |
|---|---|---|---|
| EP | 0492862 A2 | | 7/1992 |

OTHER PUBLICATIONS

Ainsworth, "Telecommunication for hvdc control" GEC Journal of Science & Technology UK, Bd. 48, Nr. 3, 1982, pp. 159-162, XP008063938, ISSN: 0022-4421.
International Search Report dated May 9, 2006.

* cited by examiner

*Primary Examiner* — Albert W Paladini
(74) *Attorney, Agent, or Firm* — Laurence A. Greenberg; Werner H. Stemer; Ralph E. Locher

(57) ABSTRACT

In a method for transmitting data in an HVDCT system to a control system for HVDCT systems, measured values are transmitted from measuring units of the HVDCT system to preprocessing units connected to one another in series. The preprocessing units use the received measured values to generate measured value data. The measured value data are transmitted as part of a data record composed of data words, and the data words are subdivided, during transmission, into a temporal sequence of individual bit groups. A first bit group contains identification data for the preprocessing unit and information on the number of further bit groups that are to be transmitted by the preprocessing unit. A downstream preprocessing unit uses the information on the number of bit groups to be transmitted by a preprocessing unit connected upstream of it to determine a time for transmitting the data word of the downstream preprocessing unit.

12 Claims, 2 Drawing Sheets

METHOD FOR TRANSMISSION OF DATA FOR CONTROLLING AN HVDC TRANSMISSION INSTALLATION

BACKGROUND OF THE INVENTION

Field of the Invention

The invention relates to a method for transmission of data in an HVDC transmission installation to a control system for HVDC transmission installations.

In known data transmission methods for HVDC transmission installations, data is transmitted from various measurement units to a control system, normally in the form of analog electrical signals using a plurality of copper cables. For this purpose, each measurement unit is connected to the control system. This involves a considerable amount of wiring complexity, and the transmission reliability is low because of the high sensitivity to electromagnetic interference. Furthermore, the use of copper cables restricts the physical extent of a measurement and control system such as this. Since different measurement units supply different amounts of data independently of one another to the control system, the transmissions are in this case not synchronized either.

BRIEF SUMMARY OF THE INVENTION

The object of the invention is to design a data transmission method of the type mentioned initially which allows flexible and reliable transmission of data from a large number of measurement units to at least one control system.

According to the invention, this object is achieved by a method for transmission of data in an HVDC transmission installation, in which measured values from measurement units in the HVDC transmission installation are transmitted to associated preprocessing units, which are connected in series with one another, and the preprocessing units use the received measured values to produce measured value data which can be processed, with the measured value data being transmitted as part of a data record which is composed of data words, and with the data words being subdivided for transmission into a time sequence of individual bit groups and with a first bit group to be transmitted comprising identification data for the associated preprocessing unit and information about the number of further bit groups to be transmitted by this preprocessing unit, and with a downstream preprocessing unit using the information about the number of bit groups to be transmitted from a preprocessing unit that is upstream of it to determine a time for transmission of the data word of this downstream preprocessing unit.

A method such as this has the advantage that the connection of the individual preprocessing units in series results in a data record which is assembled from the data words from the individual preprocessing units in that the respective next preprocessing unit adds to its data word the received data words from the upstream preprocessing units, with this all being passed to the immediately downstream preprocessing unit. The data record formed in this way is, finally, transmitted from the final preprocessing unit via a data line to the control system. Since different preprocessing units may be able to transmit different numbers of measured data values to the control system, the respective subsequent preprocessing unit from the preprocessing units which are connected in series can use the information about the number of bit groups to determine the time at which the transmission from the upstream preprocessing unit will end and can attach its data word to the received data record, transmitting this to a downstream preprocessing unit or to the control system.

A second and third bit group advantageously comprise status values for the data values. The control unit could use the status values to check the validity of the transmitted measured value data.

In one preferred embodiment, the measured value data is transmitted with the further bit groups. According to one expedient further development relating to this, a checksum is transmitted with the final bit group to be transmitted. The final bit group with the checksum ensures reliable and complete transmission of the bit groups, and therefore of the transmitted measured value data.

The data word comprises a multiplicity of bit groups, with 16 bits being used for each bit group. A subdivision such as this is supported by the software and hardware that are used, and therefore leads to time-saving and cost-effective processing.

In one advantageous refinement, individual bits are coded by means of bi-phase coding. This ensures that a synchronization signal can be unambiguously defined between individual data words since, as a result of the bi-phase coding of the bits in the data words, the same state, low or high, no longer occurs more than twice successively in one data word. A sequence of three or more low signals successively means that, for example, a synchronization signal is being transmitted, rather than data words. Because of the bi-phase coding, the synchronization signal can be identified more easily and therefore more reliably.

A first bit group to be transmitted for the identification data for the respective preprocessing unit and the information about the number of bit groups to be transmitted by this preprocessing unit in each case use 8 bits.

In one expedient refinement, the final bit group for checking the transmission is formed by a CRC checksum using a CCITT generator polynomial. The CRC checksum and the CCITT generator polynomial, which are known per se to those skilled in the art, allow the validity of the transmitted data values to be checked easily and reliably.

In a further refinement of the invention, the data words of the respective preprocessing units are separated from one another by a synchronization signal. Such separation allows simple, subsequent further data processing in the control system for the HVDC transmission installation.

A total number of more than two successive "low" signals may be used for the synchronization signal. In this case, "low" signals are the signals which correspond to a zero state of the data.

In one advantageous refinement, the synchronization signal of a first preprocessing unit has a greater number of "low" signals than the synchronization signals of the further preprocessing units. A longer synchronization signal such as this is particularly advantageous since this defines the start of the data record.

In one expedient refinement, the data is transmitted optically. This is particularly advantageous since optical transmission of digital data via optical waveguides is insensitive to electromagnetic interference.

The invention will be explained in the following text using one exemplary embodiment and with reference to the drawing, in which:

DESCRIPTION OF THE INVENTION

Figure 1:
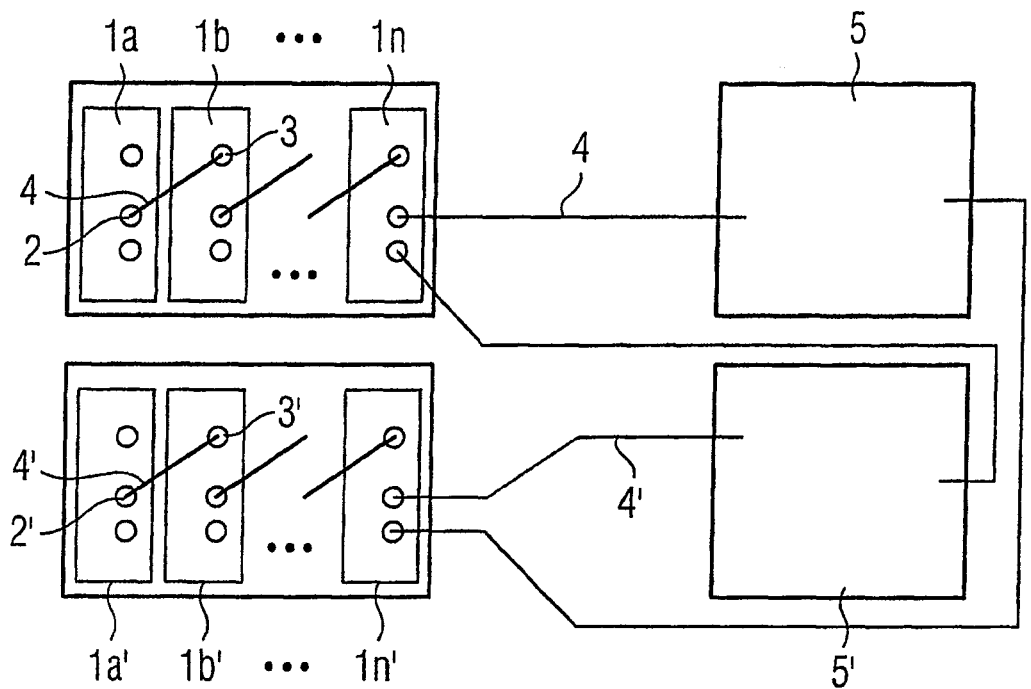
FIG. 1 shows an example of an arrangement of a plurality of preprocessing units for use of the method according to the invention.

FIG. 1 shows a schematic arrangement of a multiplicity of preprocessing units 1a . . . 1n, whose respective outputs 2 are connected to the input 3 of the respective next preprocessing unit via optical waveguides 4. The output of the final preprocessing unit 1n is connected via a further optical waveguide to a control system 5. Furthermore, the preprocessing units 1a . . . 1n are connected to various measurement units, which are not shown. Measured values which have been transmitted from the measurement units are preprocessed and converted in the preprocessing units, such that they can be processed further in a control system for the HVDC transmission installation. The preprocessed data at the respective output 2 is transmitted via the optical waveguide 4 to the input of the respective next preprocessing unit, from where it is transmitted onwards directly to the next preprocessing unit. This next preprocessing unit attaches its data to the data that has been passed on, and transmits the new data to a further preprocessing unit. The data is transmitted from the final preprocessing unit 1n to the control system 5. The first preprocessing unit 1a in this case acts as a master unit. The function of the master unit 1a will be explained in the following text with reference to FIG. 3.

FIG. 1 likewise illustrates an arrangement of the further preprocessing units 1a' . . . 1n' and of a further control system 5' which, together with the preprocessing units 1a . . . 1n and the control system 5, form a redundant control and monitoring system for the HVDC transmission installation, in that a respective second output of the final preprocessing unit 1n or 1n', respectively, is connected to a second input of the respective other control system 5' or 5. With a configuration such as this, measured values from the measurement units are transmitted to at least two arrangements of preprocessing units, from each of which they can be transferred to at least two control systems so that, if one arrangement of preprocessing units or of a control system fails, the other can in each case carry out its function.

Figure 2:
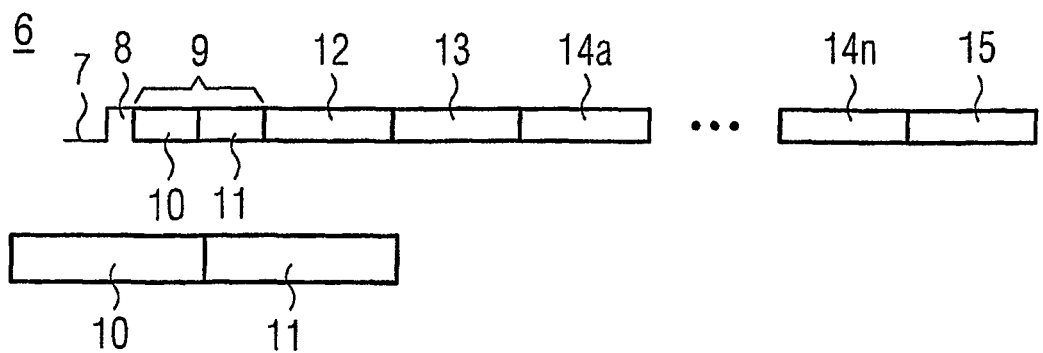
FIG. 2 shows an example of the layout of a single data word.

FIG. 2 shows the timing used for transmitting the data from an individual preprocessing unit on the basis of the method according to the invention. A data word 6 starts with a synchronization signal 7 to which a start bit 8 is attached. This is followed by a plurality of bit groups 9 . . . 14n each with a length of 16 bits, as well as a check bit group 15 at the end. The first bit group 9 comprises two bit group elements 10 and 11, each having a length of 8 bits.

The bit group element 10 is in this case formed with a bit sequence of values which identify the respective preprocessing unit. The bit group element 11 comprises information about the number of subsequent bit groups, corresponding to the number of measured values, as well as the status and check bit groups. The bit groups 12 and 13 comprise information about the status of the individual measured values to be transmitted. This information about the status of the measured values is generated by the preprocessing unit, and includes information relating to the validity of the measured values and preprocessing steps carried out. This is followed by a plurality of bit groups 14a, . . . 14n, each bit group of which corresponds to one specific measured value of the preprocessing unit. The bit group 15 at the end is used to check that the data transmitted using this data word has been transmitted reliably.

Figure 3:
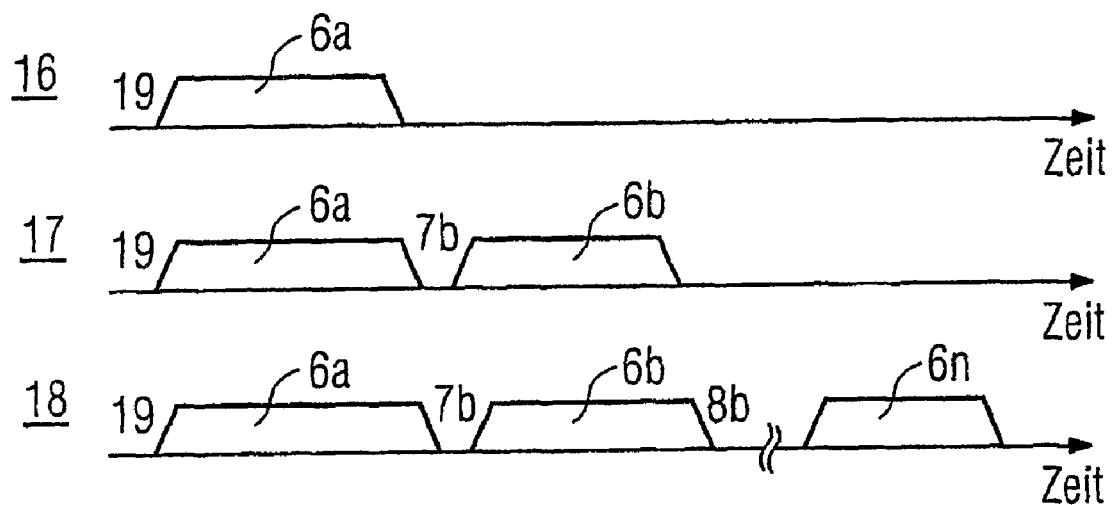
FIG. 3 shows the layout of data records comprising the data words from the individual preprocessing units.

FIG. 3 shows a data record 16 with a data word 6a from the first preprocessing unit, a data record 17 with the data word 6a and with a further data word 6b from the second preprocessing unit, as well as a data record 18 as a sequence of a plurality of data words 6a . . . 6n, corresponding to FIG. 2. The data record is in this case assembled from the individual data words from the respective preprocessing units 1a, . . . 1n. The first preprocessing unit 1a, which is used as the master unit, starts the data transmission with a master synchronization signal 19. After this master synchronization signal 19, the preprocessing unit 1a transmits a data word 6a in the format illustrated in FIG. 2. As has already been stated above, this data word 6a comprises a bit group element 11 which contains the number of bit groups within the data word 6a. This information is used in the preprocessing unit 1b to determine the time when this preprocessing unit 1b can add its synchronization signal 7b and its data word 6b to the received data word 6a that is passed on, thus producing the data record 17. In this way, at the end of the data word from the preprocessing unit preceding it, each of the further subsequent preprocessing units 1c, . . . 1n transmits its respective synchronization signal and its data word, thus resulting in the data record 18, as illustrated in FIG. 3, at the output of the final preprocessing unit 1n, and this can be transmitted via a data line 4 to a control unit 5 for further processing.

Figure 4:
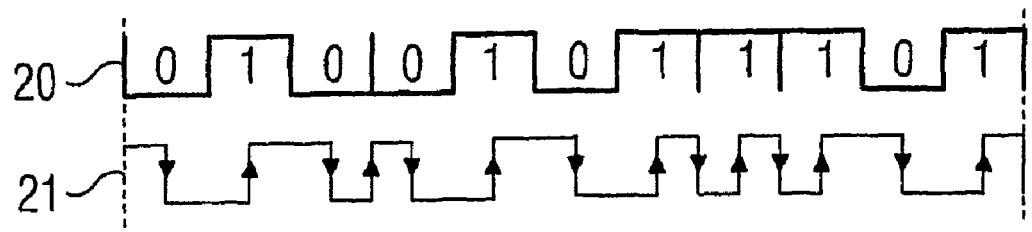
FIG. 4 shows a schematic illustration of the coding of the data to be transmitted.

FIG. 4 shows, schematically, the coding of the measured values 20 in the respective preprocessing unit in order to form the coded transmission data 21. The illustrated coding is known as so-called bi-phase coding. When using coding such as this, one measurement bit is in each case transmitted, depending on its value, by means of a signal change from 0 to 1 or 1 to 0. This coding ensures that more than two successive low or high states never occur in one data word. The illustrated measured values 20 comprise low and high signals. The low signals are indicated as 0, and the high signals by a 1. As can be seen from the coded transmission data 21, the coded transmission data 21 cannot have any immediately successive low or high signals even on the basis of measured values 20 which have a plurality of successive low or high signals.

Coding such as this allows a synchronization signal to be unambiguously defined since, for example, there are more than three successive low states. In the present example, the master synchronization signal 19 transmitted from the master unit 1a is a sequence of 13 low signals, and the synchronization signals 7b, . . . 7n transmitted from the further preprocessing units 1b, . . . 1n comprise seven successive low signals.

LIST OF REFERENCE SYMBOLS

1a,-1n Preprocessing units
2 Output
3 Input
4 Optical waveguide
5 Control system
6 Data word
7 Synchronization signal
8 Start bit
9 First bit group
10 Bit group element characterizing data
11 Bit group element information measurement data
12 Second bit group measured value status
13 Third bit group measured value status
14a,-14n Bit groups measured values 15 Bit group checksum
16 Data record from 1a
17 Data record from 1b
18 Data record from 1n
19 Master synchronization signal
20 Measurement data
21 Transmission data

The invention claimed is:

1. A method for transmission of data in an HVDC transmission installation, which comprises the steps of:
    transmitting measured values from measurement units in the HVDC transmission installation to preprocessing units, the preprocessing units being connected in series with one another;
    producing measured value data which can be processed in the preprocessing units using the measured values received; and
    transmitting the measured value data as part of a data record composed of data words, the data words being subdivided for transmission into a time sequence of individual bit groups, the individual bit groups including a first bit group to be transmitted containing identification data for a respective preprocessing unit and information about a number of further bit groups to be transmitted by the respective preprocessing unit, and a downstream preprocessing unit using the information about the number of bit groups to be transmitted from a preprocessing unit that is upstream of it to determine a time for transmission of a data word of the downstream preprocessing unit.

2. The data transmission method according to claim 1, which further comprises transmitting status values of the measured value data with second and third bit groups of the bit groups to be transmitted.

3. The data transmission method according to claim 2, which further comprises transmitting the measured value data with the further bit groups.

4. The data transmission method according to claim 3, which further comprises transmitting a checksum with a final bit group of the bit groups to be transmitted.

5. The data transmission method according to claim 4, which further comprises using 16 bits in each of the bit groups.

6. The data transmission method according to claim 5, which further comprises coding individual bits using a bi-phase coding method.

7. The data transmission method according to claim 1, which further comprises forming the first bit group to be transmitted in each case using 8 bits for the identification data for the respective preprocessing unit and 8 bits for the information about the number of further bit groups to be transmitted by the preprocessing unit.

8. The data transmission method according to claim 4, which further comprises forming the checksum of the final bit group to be transmitted by a CRC checksum with a CCITT generator polynomial.

9. The data transmission method according to claim 1, which further comprises separating the data words of the processing units from one another using a synchronization signal.

10. The data transmission method according to claim 9, which further comprises using a total number of more than two successive "low" signals for the synchronization signal.

11. The data transmission method according to claim 10, which further comprising forming the synchronization signal of a first preprocessing unit to have a greater number of "low" signals than synchronization signals of the further preprocessing units.

12. The data transmission method according to claim 1, which further comprises transmitting the data optically.

* * * * *